United States Patent [19]

Avidan

[11] Patent Number: 5,141,712
[45] Date of Patent: Aug. 25, 1992

[54] PROCESS AND APPARATUS FOR FAST FLUIDIZED BED REGENERATION OF CATALYST IN A BUBBLING BED CATALYST REGENERATOR

[75] Inventor: Amos A. Avidan, Yardley, Pa.

[73] Assignee: Mobil Oil Corporation, Fairfax, Va.

[21] Appl. No.: 729,758

[22] Filed: Jul. 15, 1991

Related U.S. Application Data

[62] Division of Ser. No. 515,933, Apr. 27, 1990, Pat. No. 5,034,115.

[51] Int. Cl.⁵ ............................................. F27B 15/08
[52] U.S. Cl. ................................... 422/144; 422/145; 422/147
[58] Field of Search ............... 422/143, 144, 145, 147; 208/113, 155, 164; 502/41, 43, 49

[56] References Cited

U.S. PATENT DOCUMENTS

| | | | |
|---|---|---|---|
| 3,785,782 | 1/1974 | Cartmell | 422/144 |
| 4,118,338 | 10/1978 | Gross et al. | 252/417 |
| 5,032,251 | 7/1991 | Owen et al. | 208/113 |

OTHER PUBLICATIONS

"Oil & Gas Journal", Fluid Catalytic Cracking Report, p. 33, A. Avidan, M. Edwards, H. Owen.

Primary Examiner—Robert J. Warden
Assistant Examiner—Timothy P. Fitzgerald
Attorney, Agent, or Firm—Alexander J. McKillop; Charles J. Speciale; Richard D. Stone

[57] ABSTRACT

A process and apparatus are disclosed for achieving turbulent or fast fluidized bed regeneration of spent FCC catalyst in a bubbling bed regenerator having a stripper mounted over the regenerator and a stripped catalyst standpipe within the regenerator. A coke combustor vessel is immersed in, and in open fluid communication with, the bubbling dense bed of the existing regenerator vessel. Spent catalyst is discharged into the coke combustor, mixes with hot regenerated catalyst which flows into the coke combustor, and regenerated with combustion air in a turbulent or fast fluidized bed. Catalyst and flue gas are discharged up into a dilute phase transport riser, preferably into cyclone which separate hot regenerated catalyst from flue gas. Regenerated catalyst is collected in the bubbling dense bed surrounding the coke combustor, and some is recycled by flowing into the coke combustor for direct contact heat exchange.

8 Claims, 2 Drawing Sheets

PROCESS AND APPARATUS FOR FAST FLUIDIZED BED REGENERATION OF CATALYST IN A BUBBLING BED CATALYST REGENERATOR

This is a division of copending application Ser. No. 07/515,933 filed on Apr. 27, 1990 now U.S. Pat. No. 5,034,115, issued Jul. 23, 1991.

BACKGROUND OF THE INVENTION

1. Field of the Invention

The invention relates to a process and apparatus for the regeneration of fluidized catalytic cracking catalyst.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500°0 C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use or zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20–60 seconds, much less contact time is needed. The desired conversion of feed can now be achieved in much less time, and more selectively, in a dilute phase, riser reactor.

Although reactor residence time has continued to decrease, the height of the reactors has not. Although the overall size and height of much of the hardware associated with the FCC unit has decreased, the use of all riser reactors has resulted in catalyst and cracked product being discharged from the riser reactor at a fairly high elevation. This elevation makes it easy for a designer to transport spent catalyst from the riser outlet to a catalyst stripper at a lower elevation, to a regenerator at a still lower elevation.

The need for a somewhat vertical design, to accommodate the great height of the riser reactor, and the need to have a unit which is compact, efficient, and has a small "footprint", has caused considerable evolution in the design of FCC units, which evolution is reported to a limited extent in the Jan. 8, 1990 Oil & Gas Journal article. One modern, compact FCC design is the Kellogg Ultra Orthoflow converter, Model F, which is shown in FIG. 1 of this patent application, and also shown as FIG. 17 of the Jan. 8, 1990 Oil & Gas Journal article discussed above. The compact nature of the design, and the use of a catalyst stripper which is contiguous with and supported by the catalyst regenerator, makes it difficult to expand or modify such units. This means that the large, bubbling dense bed regenerator is relatively difficult to modify, in that it is not easy to increase its height much. As the regenerator vessel usually is at or near grade level, it is difficult to do more than minor modifications under the regenerator.

Although such a unit works well in practice, the use of a bubbling bed regenerator is inherently inefficient, and troubled by the presence of large bubbles, poor catalyst circulation, and the presence of stagnant regions. The bubbling bed regenerators usually have much larger catalyst inventories, and longer catalyst residence times, to allow an increase in residence time make up for a lack of efficiency.

For such units, characterized by a stripper mounted over, and partially supported by, a bubbling dense bed regenerator, there has been no good way to achieve the benefits of high efficiency regeneration, in a fast fluidized bed (FFB) region.

I studied this design, and realized that there was a way to achieve the benefits of FFB coke combustion, while retaining most of the original design. I realized there was a way to get FFB combustion, with catalyst recycle to the FFB region, without much of the equipments normally required, such as slide valves that cost about $1,000,000 each, and are usually required in pairs. Relying on the laws of physics rather than slide valves, permitted FFB combustion, within a bubbling fluidized bed, with catalyst recirculation from the bubbling fluidized bed to the FFB region. My approach allowed essentially all of the existing regenerator equipment to be used, with additional equipment added which did not need to be attached to or supported by the side or base of the regenerator vessel, minimizing problems of supporting the new equipment and thermal expansion.

BRIEF SUMMARY OF THE INVENTION

Accordingly, the present invention provides a process for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst, having a dense bed height, to which an oxygen containing regeneration gas is added and from which hot regenerated catalyst is withdrawn and recycled to said riser reactor, characterized by: discharging said stripped catalyst from said catalyst stripper standpipe into a coke combustor vessel which is at least partially immersed in said bubbling dense bed, said coke combustor vessel having a base region at an elevation below said bubbling dense bed and which is in open fluid communication with said bubbling dense bed via at least one opening from said bubbling dense bed to said coke combustor which is essentially free of mechanical flow control means; recycling to said coke combustor hot regenerated catalyst from said bubbling dense bed regenerator in an amount sufficient to heat said stripped catalyst by direct contact heat exchange to an increased temperature which promotes rapid coke combustion from spent catalyst within said coke combustor; combusting coke on said heat exchanged, stripped catalyst by adding an oxygen containing regeneration gas to said coke combustor vessel in an amount sufficient to provide a superficial vapor velocity which will maintain a majority of the stripped catalyst added thereto in a state of turbulent or fast fluidization; and sufficient to at least partially regenerate said spent catalyst and produce at least partially regenerated catalyst and flue gas; discharging and separating, from an upper portion of said coke combustor, said at least partially regenerated catalyst and flue gas into a flue gas stream and a regenerated catalyst stream which is collected as said bubbling fluidized bed surrounding said coke combustor; and recycling hot regenerated catalyst from said bubbling dense bed to said open coke combustor.

In another embodiment, the present invention provides an apparatus for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, said regeneration zone characterized by a stripper catalyst standpipe having a stripped catalyst inlet connective with said catalyst stripper and an outlet a coke combustor means having an upper portion extending up into said dilute phase region of said regenerator and a lower portion extending down into said bubbling dense bed, said coke combustor having an inlet connective with said stripper standpipe catalyst outlet, at least one inlet means in open fluid communication with said bubbling dense bed, at least one regeneration gas inlet in said lower portion, and an outlet for catalyst and flue gas in said upper portion.

DESCRIPTION OF PREFERRED EMBODIMENTS

Figure 1:
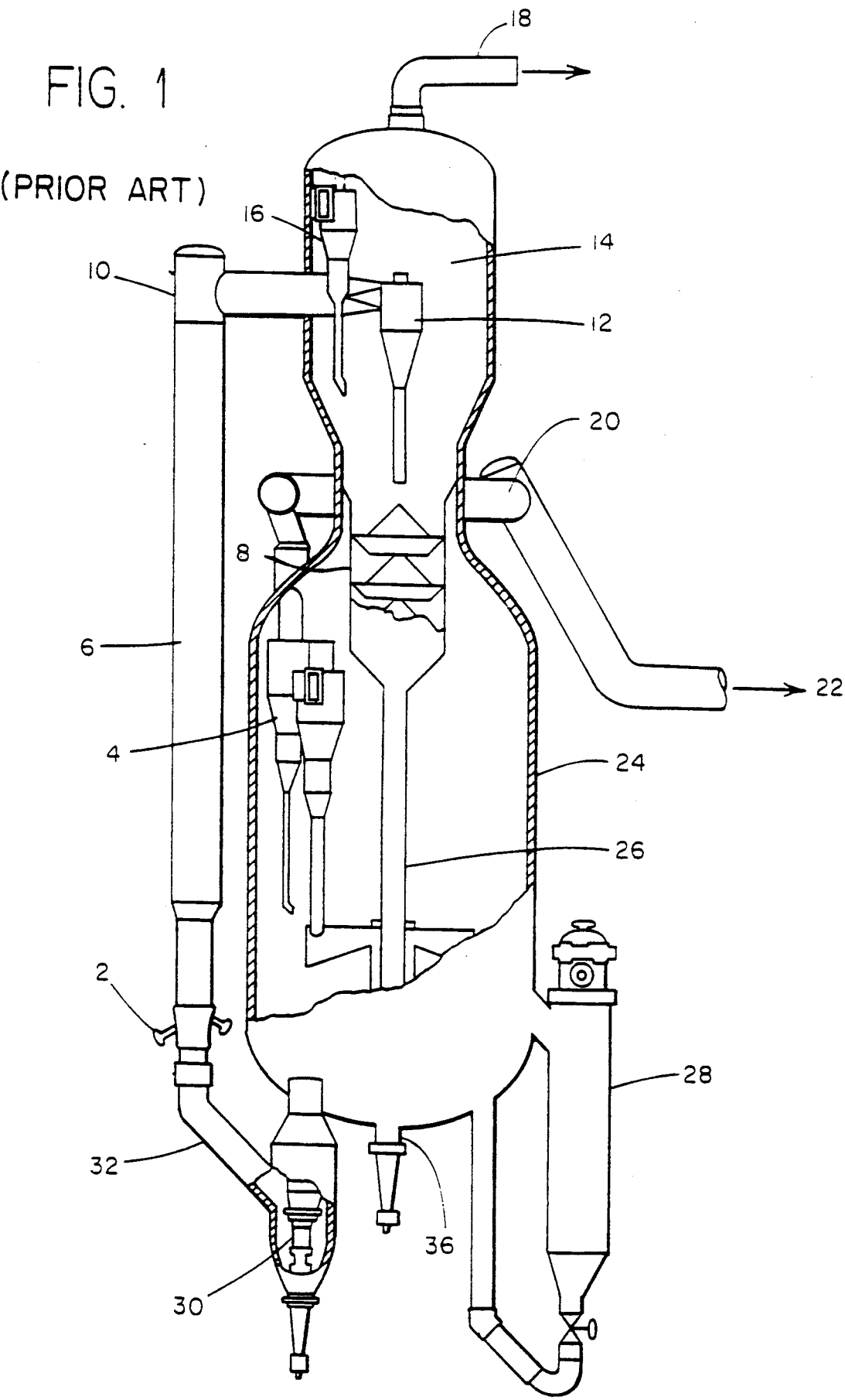
FIG. 1 (prior art) is a schematic view of a conventional fluidized catalytic cracking unit, with a bubbling dense bed regenerator.

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal.

A heavy feed such as a gas oil, vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4, and discharged into plenum 20 for discharge to the flare via line 22.

The regenerator of FIG. 1 is good regenerator, but its compactness, and integration of the catalyst stripper into the bubbling dense bed regenerator, make modifications difficult. It is hard to raise the regenerator, or the top of the regenerator, because it is tied in so closely with the riser reactor and the catalyst stripper. It is difficult to expand the regenerator downward, because the base of the regenerator is usually at as low an elevation as possible. I realized that to significantly improve this regenerator design, it was necessary to create a fast fluidized bed region within the confines of the existing unit. It would also be beneficial if the new equipment could be hung from the top of the regenerator shell, rather than supported by the sides of base of the regenerator. While equipment can be and is, supported by welding or attaching it to the sides or base of a regenerator shell, the problems of thermal expansion in FCC regenerators are formidable. The great swings in temperature, and the large size and rigidity of the equipment used in FCC regenerators, and the need to remain in operation for years, make it difficult to affix large surfaces to the base of walls of the regenerator vessel.

Figure 2:
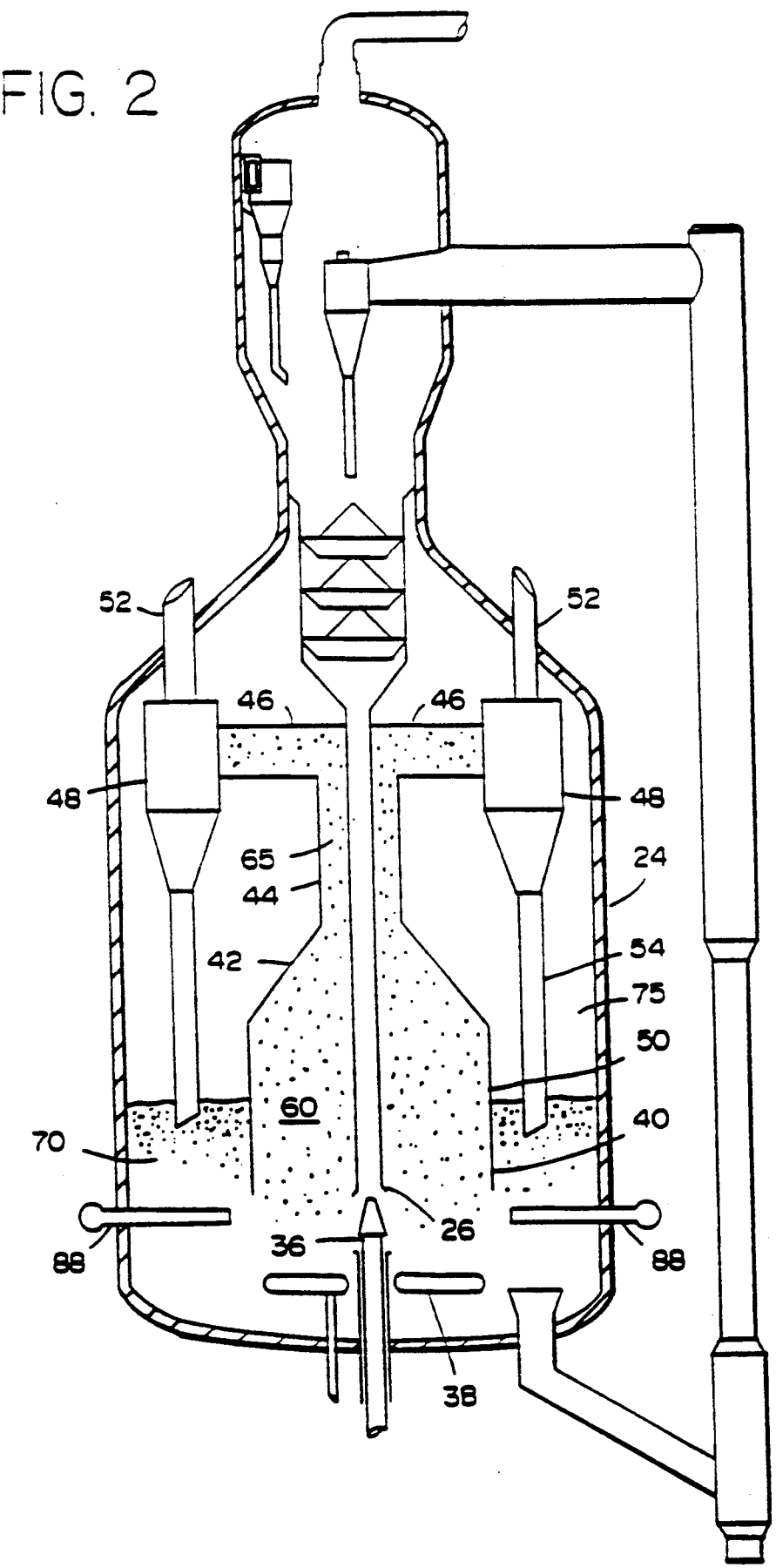
FIG. 2 (invention) is a schematic view of a regenerator of the invention, with a FFB region created within the bubbling dense bed of the regenerator.

In FIG. 2 (invention) only the changes made to the old regenerator shell 24 are shown. Like elements in FIG. 1 and 2 have like numerals. A high efficiency regenerator bell shaped vessel 50 is added to the old regenerator vessel 24. This interacts with the existing bubbling dense bed regenerator to create a localized region of turbulent fluidization, or fast fluidization.

Stripped catalyst from the catalyst stripper 8 is discharged via stripper dipleg 26 down into the regenerator to meet plug valve 36, as in the conventional regenerator shown in FIG. 1. In the FIG. 2 embodiment, however, the catalyst is discharged into a relatively dense bed, fast fluidized bed region 60, where incoming spent catalyst contacts regeneration gas, usually air, added via multiple inlets 38. Although the conventional air grid can be used, it may be beneficial to modify it some, and add more of the regeneration air nearer the center of the regenerator, and provide for multiple levels of air addition. Such modifications are beneficial, but costly, and the projected benefits must be weighed against the cost.

In bell shaped vessel 50 the air admission rate, the cross-sectional area available for flow at the base region 40, and catalyst addition and catalyst recycle, are adjusted to maintain much or all of the bed in a "fast fluidized condition", characterized by intense agitation, relatively small bubbles, and rapid coke combustion. This region, region 60, may sometimes be referred to hereafter as the coke combustor. In terms of superficial vapor velocity and typical FCC catalyst sizes, this means the vapor velocity should exceed 4 feet per second, preferably is 5-15 feet per second, and most preferably is 5-10 feet per second. The catalyst density in a majority of region 60, will be less than 35 pounds/cubic foot, and preferably less than 30 pounds/cubic foot, and ideally about 25 pounds/cubic foot, and even less in the upper regions of the coke combustor, where the diameter of the bell shaped vessel decreases, as indicated generally at 42. As flow approaches dilute phase conditions, the density will be 10 pounds/cubic foot, or less.

The partially regenerated catalyst, and partially consumed combustion gas are discharged out the top of FFB region 60 into a dilute phase transport riser 44, which preferably forms an annulus around the spent catalyst standpipe, as shown in the Figure. Dilute phase conditions prevail in this region, shown as 65 in the Figure. Here rapid combustion of CO to $CO_2$, and some additional coke combustion can also be achieved. Addition of secondary air, to the base of the transport riser, or at higher elevations therein by means not shown, can also be practiced to augment coke or CO combustion.

The catalyst and flue gas are discharged into the existing dilute phase space above the prior art dense bed. Preferably a catalyst/flue gas separation means, such as cyclones 48, are used to separate the bulk of the catalyst from the bulk of the flue gas, and reduce to some extent the amount of catalyst dispersed in the dilute phase region 75. Use of cyclones, extended arms which discharge catalyst down, or a cap much, like a bubble cap on a distillation column, can be used to achieve the desired separation of catalyst from flue gas discharged from the dilute phase transport riser into the dilute phase region 75 above the bubbling dense bed.

In the embodiment shown, hot regenerated catalyst recovered by the cyclones 48 is discharged down via diplegs 54 into the bubbling dense phase fluidized bed 70 in the base of the existing regenerator shell 24. Additional regeneration gas may be added, by means not shown, if desired. It is of course essential to have some sort of fluffing fluid present, such as fluffing air, to maintain the dense bed 70 in a fluidized state. Usually only enough air will be added to maintain fluidization. In this design, the large amount of catalyst traffic, and high circulation rates of catalyst in the bubbling bed, may greatly reduce or even eliminate the need for fluffing or regeneration air in the second dense bed.

It will be beneficial to recycle some hot regenerated catalyst from bubbling dense bed 70 into the fast fluidized bed region 60 in bell shaped vessel 50. Such recycle can come from flow under the bell lower portion 40, from the dipleg 54 of a cyclone, or via an aspirated lift tube such as that used in the Horecky patent (U.S. Pat. No. 3,909,392, Sep. 30, 1975). Catalyst underflow, as shown in the drawing, is preferred because it is simple, reliable and controllable.

Although an open annular region is indicated in the Figure, it will be appreciated that myriad other functionally equivalent fluid communication means may be provided, such as slits or slots, holes, perforation. A few deep, V-shaped notches in the bell, or graduated numbers of holes, i.e., many $\frac{1}{2}''$ holes at the widest part of the bell, and an equal number of $\frac{1}{4}''$ holes at higher, narrower elevations of the bell, may be used to facilitate flow control from the bubbling dense bed into the FFB region.

Catalyst underflow, for recycle of hot regenerated catalyst from the bubbling dense bed to the fast fluidized bed region, is simply and reliable because there are no moving parts. Catalyst from the bubbling bed flow gradually in, or can be aspirated in if desired by providing horizontal air jets 88, or vertical jets (not shown) in the FFB region near the base section 40 of the bell shaped vessel. There are no slide or plug valves, and no narrow passageways or pipes, needed to transfer catalyst from the bubbling dense bed to the FFB region. Control of catalyst recycle can be achieved increasing the level catalyst in the bubbling dense bed 70, by decreasing the pressure in the base or the FFB region 60, or by conventional aspiration or eduction techniques, such as air jets 88.

The regenerator has a very large operating window in regard to catalyst recirculation rate. The unit will operate well with very low rates of catalyst recirculation, because of the efficient nature of FFB catalyst regeneration, and because the incoming spent catalyst will be preheated to a significant extent in the stripper standpipe, especially when the dilute phase transport riser encompasses the standpipe as shown in the Figure. The unit tolerates operation with large amounts of recycle, the catalyst merely circulates rapidly within the regenerator vessel. The use of some sort of catalyst/flue gas separation device, such as the cyclones 48 shown, is preferred so that even if large catalyst circulation rates are achieved the catalyst traffic in the dilute phase region 75 above the second dense bed will not be inordinately increased. Operation with large amounts of recycle reduces the apparent coke concentration of catalyst in the FFB region, but increases the temperature and the coke burning rate so efficient regeneration is still achieved, even with 5:1 or higher recycled:spent catalyst ratios.

DESCRIPTION OF PREFERRED EMBODIMENTS

FCC FEED

Any conventional FCC feed can be used. The process of the present invention is especially useful for processing difficult charge stocks, those with high levels of CCR material, exceeding 0.5 and up to 10 wt. % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids, and mixtures thereof. The present invention is most useful with feeds having an initial boiling point above about 650° F.

The most uplift in value of the feed will occur when a significant portion of the feed has a boiling point above about 1000° F., or is considered non-distillable, and when one or more heat removal means are provided in the regenerator, as shown in FIG. 1 or in FIG. 3.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-50 wt. % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt. % RE.

Relatively high silica zeolite containing catalysts are preferred for use in the present invention. They withstand the high temperatures usually associated with complete combustion of CO to $CO_2$ within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides).

Good additives for removal of SOx are available from several catalyst suppliers, such as Katalistiks International, Inc.'s "DeSox."

CO combustion additives are available from most FCC catalyst vendors.

The FCC catalyst composition, per se, forms no part of the present invention.

CRACKING REACTOR/STRIPPER/REGENERATOR

The FCC reactor, stripper and regenerator shell 24, per se, are conventional, and are available from the M. W. Kellogg Company.

The modifications needed to add the bell shaped vessel, or an equivalent other shape to create a FFB region within the dense bed in the the base of the existing regenerator shell 24 are well within the skill of the art.

COMBUSTOR VESSEL

Although a generally bell shaped vessel, as shown in the FIG. 2 is preferred for use herein, it is not essential. A pyramid, inverted cone funnel or other equivalent shape though with some degradation in performance which may be offset by cheaper fabrication and/or installation costs.

The bell shaped vessel is preferred for its efficiency, i.e., it achieves an efficient and gradual increase in superficial vapor velocity within the FFB region, providing a smooth transition to dilute phase flow in or near the inlet to the transport riser. It also presents a large sloping surface to the dilute phase region within the regenerator dilute phase, which promotes catalyst settling and gradual compaction to form a dense phase bubbling bed in region 70. Such a shape responds gracefully to changes in air or spent catalyst flow, any change in a process flow causes only a minor change in the operation of the FFB region or the bubbling bed region.

Also suitable, but not preferred, are designs with step changes in diameter. An inexpensive, and hard to control but workable, design calls for two lengths of pipe, with two different diameters. If a regenerator vessel 24 had a diameter of 10 meters, a FFB region can be formed by suspending a suitable length, say 2-10 meters, of pipe having a diameter of 6-9.5 meters, and preferably of 7-9 meters, from the top of the regenerator. The dilute phase transport riser can comprise another suitable length of pipe, say 3-15 meters, having a diameter of 1-4 meters, and preferably 1.5-3.5 meters, and sufficient to accommodate the stripper standpipe 26. This can also be supported from the top of the regenerator, or from the stripper. The two diameters of pipe could be connected via a weld cap, which would provided something of a transition section, or a flat plate having an outer diameter equal to the large diameter pipe and an inner hole with a diameter equal to that of the small diameter pipe. Such an arrangement, because of its sudden changes in diameter, could respond very differently to small changes in process flows, so greater care would be needed to assure smooth operation.

The FFB vessel, regardless of its precise shape, should be sized so that in operation it will produce in the FFB region a superficial vapor velocity in excess of about 3.5 feet per second, preferably a vapor velocity of 4 to 15 fps, and most preferably of 4 to 10 fps. The dilute phase transport riser should be sized so that in operation it will produce a superficial vapor velocity in excess of about 10 feet per second i.e., conventional dilute phase transport riser conditions.

The FFB vessel should leave sufficient space around the perimeter thereof to allow free flow of freshly regenerated and recycled catalyst and to allow this catalyst to collect as a bubbling dense phase fluidized bed. Usually this will call for size, relative to catalyst and regeneration or fluffing air flow to permit superficial vapor velocities below 4 feet per second, preferably below 3 fps, and most preferably 0.5 to about 2.5 fps.

The densities and superficial vapor velocities discussed herein presume that the unit operates at a pressure where the vast majority of FCC units operate, namely 25-40 psig. A few might operate at slightly lower pressures, and a significant minority may operate at somewhat higher pressures, primarily those with power recovery systems. Changes in pressure change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed.

The amount of underflow can be controlled by using conventional techniques, similar to those used for designing flow systems for irrigation systems and fractionators. Large heads permit use of small passageways for fluid flow, in which case a few, relatively small diameter pipes, tubes or openings will be sufficient to allow catalyst to flow from the bubbling dense bed into the coke combustor.

Large passageways permit use of very small pressure drops. An extreme case is that shown in the Figure using the inverted bell shape. The large, annular opening provides very little resistance to fluid flow, so very little head or differential pressure is needed to cause fluid to flow from the bubbling dense bed into the regenerator.

The regenerator of the present invention does not require an extremely reliable seal, because there is a similar atmosphere on both sides of the inverted bell. A flow reversal may degrade regenerator operation, but the unit will not blow up. Thus the seal requirements are much less than those needed to isolate an oxidizing atmosphere (the regenerator) from the hydrocarbon rich environments of the reactor and the stripper.

Control of the amount of catalyst inventory can also be used to adjust the amount of sealing. Operation with a larger than normal inventory will increase the seal of an inverted bell type unit in the bubbling dense bed.

Regardless of the geometry used to achieve a fast fluidized bed or dilute phase transport riser, the conditions in these regions, once created, are very similar to those used in conventional High Efficiency Regenerators (HER) now widely used in FCC units. Typical H.E.R. regenerators are shown in U.S. Pat. No. 4,595,567 (Hedrick), U.S. Pat. No. 4,822,761 (Walters, Busch and Zandona) and U.S. Pat. No. 4,820,404 (Owen), which are incorporated herein by reference. These conditions are conventional, what is unconventional is achieving fast fluidized bed catalyst regeneration in a bubbling bed regenerator with a superimposed catalyst stripper discharging spent catalyst down directly into the regenerator via a standpipe within the dense bed regeneration vessel.

FCC REACTOR CONDITIONS

Conventional riser cracking conditions may be used. Typical riser cracking reaction conditions include catalyst/oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900° to about 1050° F.

CO COMBUSTION PROMOTER

Use of a CO combustion promoter in the regenerator or combustion zone is not essential for the practice of the present invention, however, it is preferred. These materials are well-known.

U.S. Pat. Nos. 4,072,600 and 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

BENEFITS OF FFB COKE COMBUSTION

The process and apparatus of the present invention allow the benefits of high efficiency catalyst regeneration to be achieved in a bubbling dense bed unit. Using the FFB region, or the coke combustor, to burn most of the coke allows the amount of excess air to be greatly reduced. Typical bubbling dense bed units operate with around 2% oxygen in the flue gas. Use of an internal coke combustor sunken in a bubbling dense bed, and receiving catalyst recycle from the bubbling dense bed, allows much less excess air to be used, with operation with 0.3–0.8% $O_2$ in the flue gas being possible. The amount of NOx in the flue gas will also be significantly reduced, in part because of the reduction in oxygen content and in part because FFB regeneration of catalyst seems to produce less NOx, perhaps because some portions of the FFB region operate at somewhat reducing conditions, or perhaps because of the presence of carbonaceous particles throughout the FFB.

The present invention may be readily retrofitted into existing bubbling bed regenerators, such as that shown in FIG. 1. All of the equipment needed, such as the bell shaped vessel, and the preferred embodiments such as cyclones, can be suspended from the top of the vessel. The bell need not be affixed to either the walls or the floor of the existing regenerator vessel, so that thermal expansion problems are minimal. Recycling catalyst by allowing flow under the bell eliminated the expensive valves customarily used to control this catalyst flow.

The coke combustor vessel may also be a closed vessel immersed in the bubbling dense bed, provided it remains in open fluid communication with the bubbling dense bed for catalyst recycle. Catalyst recycle can occur through a plurality of openings in such a closed vessel which allow flow of catalyst from the bubbling dense bed into the coke combustor.

I claim:

1. An apparatus for the fluidized catalytic cracking of a heavy hydrocarbon feed comprising:
    a reactor vessel;
    a riser reactor, having a base section and an upper section;
    an inlet in the base of the riser for a heavy feed;
    an inlet in the base of the riser for a source of regenerated catalytic cracking catalyst;
    an outlet in the upper section of the riser for discharging catalytically cracked products and spent catalyst into said reactor vessel;
    a catalyst disengaging zone within the reactor vessel for separation of cracked products from spent catalyst;
    a spent catalyst stripper in a base portion of said reactor vessel contiguous, in fluid communication with and beneath said disengaging zone and having a spent catalyst inlet in an upper portion thereof, a stripped catalyst outlet in a lower portion thereof, and a stripping gas inlet in a lower portion thereof;
    a vertical stripper standpipe beneath the spent catalyst stripper having an inlet connective with the stripped catalyst outlet and having a standpipe catalyst outlet in a lower portion thereof;

a catalyst regenerator vessel, contiguous, in fluid communication with and beneath the stripper, having an upper section and a lower section;

said catalyst regenerator vessel being connected to said regenerated catalytic cracking catalyst inlet in said riser reactor for delivery of said regenerated catalyst to said riser reactor;

a coke combustor vessel, encompassed by and within a lower section of the regenerator vessel, having a lower portion, with a cross sectional area;

an upper portion, of reduced cross sectional area relative to the lower portion of the coke combustor vessel, extending up into the upper section of the catalyst regenerator vessel;

at least one gas distributor in communication the lower portion of the coke combustor vessel for oxygen containing regeneration gas;

an inlet for stripped catalyst within the coke combustor vessel defined by the stripper standpipe catalyst outlet;

an outlet for catalyst and flue gas in the upper portion of the coke combustor vessel; and a regenerated catalyst recycle means, which permits open fluid communication from the lower section of the catalyst regenerator vessel into the lower portion of the coke combustor vessel.

2. The apparatus of claim 1 wherein said upper portion of said coke combustor comprises a dilute phase transport riser means having a reduced cross sectional area relative to a cross sectional area of said coke combustor at a base thereof, said transport riser having a lower inlet for receiving catalyst and flue gas and an upper outlet.

3. The apparatus of claim 2 wherein said outlet of said dilute phase transport riser discharges into a catalyst/flue gas separation means.

4. The apparatus of claim 2 wherein said outlet of said dilute phase transport riser discharges into a cyclone separator.

5. The apparatus of claim 2 further characterized in that said stripped catalyst standpipe is axially aligned with and enclosed by a dilute phase transport riser which forms an upper portion of said coke combustor.

6. The apparatus of claim 5 wherein cyclone separators are connected to the transport riser outlet to separate catalyst from flue gas.

7. The apparatus of claim 1 wherein the regenerator vessel has a floor and the coke combustor vessel is selected from the group consisting of an inverted open cone funnel or an open bell shaped vessel, having an open base portion which is mounted above the floor of the regenerator vessel, and wherein the regenerated catalyst recycle means comprises a means defining an opening in said base portion of said funnel or bell shaped vessel.

8. The apparatus of claim 1 wherein said coke combustor comprises a closed vessel and wherein the regenerated catalyst recycle means comprises a plurality of slits, slots, holes or perforations in the lower portion of the coke combustor vessel.

* * * * *